US011975873B2

(12) United States Patent
Schäfer et al.

(10) Patent No.: US 11,975,873 B2
(45) Date of Patent: May 7, 2024

(54) APPARATUS FOR THE TRACK INDIVIDUAL PROVISION OF SHEET MATERIAL FOR PLACING UNDERNEATH

(71) Applicant: Weber Maschinenbau GmbH Breidenbach, Breidenbach (DE)

(72) Inventors: Marvin Schäfer, Biedenkopf (DE); Thorsten Schneider, Weimar/Lahn (DE); Markus Gerhardt, Biedenkopf (DE); Florian Reitz, Bad Laasphe (DE); Julian Nolte, Leun-Biskirchen (DE); Heiko Knöppel, Gemünden (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 0 days.

(21) Appl. No.: 17/522,240

(22) Filed: Nov. 9, 2021

(65) Prior Publication Data

US 2022/0144465 A1 May 12, 2022

(30) Foreign Application Priority Data

Nov. 10, 2020 (DE) ........................ 102020129647.9

(51) Int. Cl.
*B65B 25/08* (2006.01)
*B26D 7/32* (2006.01)
(Continued)

(52) U.S. Cl.
CPC ................ *B65B 25/08* (2013.01); *B26D 7/32* (2013.01); *B26D 7/325* (2013.01); *B65B 41/16* (2013.01);
(Continued)

(58) Field of Classification Search
CPC .......... B26D 7/32; B26D 7/325; B65B 41/16; B65B 25/08; B65B 57/08; B65B 65/006;
(Continued)

(56) References Cited

U.S. PATENT DOCUMENTS

| | | | | |
|---|---|---|---|---|
| 5,024,128 A * | 6/1991 | Campbell, Jr. | ........ | B26D 1/626 83/37 |
| 5,537,798 A * | 7/1996 | Fukuda | ................ | B65B 59/003 53/201 |
| 5,548,947 A * | 8/1996 | Fincham | .............. | B65B 51/306 53/551 |
| 5,611,253 A * | 3/1997 | Saito | ................. | B65H 35/0066 83/676 |

(Continued)

FOREIGN PATENT DOCUMENTS

| | | |
|---|---|---|
| DE | 102017118927 A1 | 1/2019 |
| DE | 102019106369 A1 | 9/2020 |

OTHER PUBLICATIONS

German Search Report from the German Patent and Trademark Office for related German Application No. 102020129647.9; dated Aug. 17, 2021; 7 pages.

*Primary Examiner* — Omar Flores Sanchez
(74) *Attorney, Agent, or Firm* — Erise IP, P.A.

(57) ABSTRACT

The invention relates to an output unit for a provision individually per track of sheet material for placing beneath products fed on two or multiple tracks, in particular beneath food portions, said output unit comprising a draw-in device that is configured to draw in individually per track a respective one material web of the sheet material per track and that in particular has at least one driven draw-in shaft and at least one draw-in pressure unit; a separation device that is configured to separate the sheet material from the material webs; and an ejection device that is configured to discharge sheet material on two or multiple tracks and that comprises a driven ejection roller and an ejection counter-unit that forms an ejection gap for the sheet material together with the ejection roller, wherein the ejection roller is jointly associated with at least two tracks.

10 Claims, 6 Drawing Sheets

(51) Int. Cl.

| | |
|---|---|
| ***B65B 41/16*** | (2006.01) |
| ***B65B 57/08*** | (2006.01) |
| ***B65B 65/00*** | (2006.01) |
| ***B65H 16/02*** | (2006.01) |
| ***B65H 29/20*** | (2006.01) |
| ***B65H 35/00*** | (2006.01) |
| ***B65H 35/08*** | (2006.01) |

(52) U.S. Cl.
CPC ............ *B65B 57/08* (2013.01); *B65B 65/006* (2013.01); *B65H 16/02* (2013.01); *B65H 29/20* (2013.01); *B65H 35/0086* (2013.01); *B65H 35/08* (2013.01); *B65H 2553/30* (2013.01)

(58) Field of Classification Search
CPC .... B65H 35/0086; B65H 35/08; B65H 16/02; B65H 29/20; B65H 2553/30
USPC ............................................................ 83/107
See application file for complete search history.

(56) References Cited

U.S. PATENT DOCUMENTS

| | | | | |
|---|---|---|---|---|
| 5,810,149 | A * | 9/1998 | Sandberg | B65G 47/71 198/369.2 |
| 2005/0270357 | A1* | 12/2005 | Kawai | B26D 5/34 347/105 |
| 2008/0250944 | A1* | 10/2008 | Pryor | B65B 25/08 83/175 |
| 2013/0167477 | A1* | 7/2013 | Vasse | B65H 20/02 53/209 |
| 2018/0334271 | A1* | 11/2018 | Wolf | B65B 61/02 |
| 2020/0108520 | A1* | 4/2020 | Pryor | B26D 7/30 |
| 2020/0230838 | A1* | 7/2020 | Einloft-Velte | B26D 1/565 |
| 2020/0254641 | A1* | 8/2020 | Hocker | A22C 17/0093 |
| 2020/0262659 | A1* | 8/2020 | Fox | B65G 23/04 |
| 2020/0338778 | A1* | 10/2020 | Dong | B26D 5/02 |
| 2020/0371499 | A1* | 11/2020 | Ward | G05B 19/4183 |
| 2022/0332450 | A1* | 10/2022 | Mun | B65B 51/14 |

* cited by examiner

APPARATUS FOR THE TRACK INDIVIDUAL PROVISION OF SHEET MATERIAL FOR PLACING UNDERNEATH

CROSS-REFERENCES TO RELATED APPLICATIONS

This Patent Application claims the priority of German Patent Application 102020129647.9, filed on Nov. 10, 2020, which is incorporated herein by reference, in its entirety.

BACKGROUND

The invention relates to an output unit for a provision individually per track of sheet material for placing beneath products fed on two or multiple tracks, in particular beneath food portions, and to a corresponding material provision unit for a provision individually per track of sheet material. The invention further relates to an underlay unit for a provision individually per track of sheet material, said underlay unit comprising an output unit and a material provision unit.

Underlay sheets, which can e.g. comprise one slice or a plurality of slices of a food product, can be provided beneath food portions by such an underlay unit. An underlay sheet can, for example, be introduced between a slice of a food product and a support surface on which this slice is disposed. Such a function is also designated as an "underleaver" function and is generally known in the field of the slicing and packaging of food products.

At the same time, further underlay sheets can also be provided within a food portion that are, for example, placed beneath individual slices of the food product or also beneath part portions of the food portion, wherein a part portion can comprise a certain number of slices of the food product. It is conceivable that individual part portions are first underlaid with underlay sheets and are then grouped together, for example stacked or overlapped, to form a complete food portion.

It is ensured by such an underleaver function that the products are not, or are at least not with their total lower side, disposed directly on a support surface, for example on a conveying device prior to the packaging or on the packaging material or a further part portion within the packaging in the packaged state. In addition, the handling and the packaging of the food products are facilitated, in particular for sensitive or finely sliced products such as bacon.

Paper or a plastic film can, for example, serve as sheet material for the underlay sheets. The underlay unit typically conveys material webs of sheet material, which are unwound or removed from a material web roll, to a transport path of the food portions, for instance a conveying device having one or more conveyor belts. The underlay unit typically comprises an output unit having a separation device that separates suitably dimensioned underlay sheets from the material webs that are then brought beneath the food portions by an ejection device of the output unit.

Underlay units of the type described above are, for example, integrated into a portion transport path that is responsible for the transport of portions from at least one slicing device, in particular a high-performance slicer, to at least one packaging apparatus. Such systems, which comprise at least one slicing device and at least one packaging apparatus as well as a transport device connecting the two devices for transporting the sliced (food) portions from the slicing device to the packaging apparatus, enable an efficient production of completely packaged products that practically requires no or only little intervention of operating personnel.

These systems can comprise further components that are, for example, provided for processing and/or checking the product or the portions and/or for assembling the portions.

The invention further relates to an underlay apparatus comprising a product feed that is configured to feed the products on two or multiple tracks to a sheet feed region; an underlay unit; and a product outfeed that is configured to lead the products on two or multiple tracks away from the sheet feed region.

Food portions are often conveyed on transport belts. An underlay unit is generally arranged between a product feed belt and a product outfeed belt, with an intermediate space being provided between the two belts. Through the intermediate space, the sheet material can be conveyed from the output unit of the underlay unit into the transport path of the food portions and can ultimately be introduced between the food portion and the product outfeed belt, i.e. placed under the portion.

Furthermore, the invention relates to an apparatus for slicing and packaging products that comprises a cutting apparatus for slicing the product; an underlay apparatus; and a packaging apparatus for packaging the portions underlaid with sheet material.

Such cutting apparatus can comprise so-called slicers or high-speed slicers that can e.g. slice bar-shaped or loaf-shaped food products at high cutting speeds of a plurality of hundred to some thousand slices per minute. In many applications, stacked or overlapping portions are, for example, formed from the cut-off slices falling onto a support surface that is e.g. formed by a portioning belt. The portioning belt itself, or also an adjoining belt device, can serve as a product feed belt that feeds the food portions to an underleaver.

For an optimal performance of a cutting and packaging line, the cutting process and the product feed can in particular take place on multiple tracks, wherein a plurality of products disposed next to one another—one product in each track—are simultaneously sliced and transported on multiple tracks, for example, by means of one or more portioning belts. In this case, the product feed to the underlay unit is also advantageously of multi-track design. An operation individually per track of the individual tracks is particularly advantageous. A multi-track design or operation individually per track is in particular to be understood—depending on the purpose of the respective functional unit and on the respective application—such that each track of the apparatus or of the respective functional unit can be operated independently of other tracks, i.e. such that each track can, for example, be individually traveled, controlled, moved, stopped, set, configured, at least partly dismantled and reassembled and at least partly exchanged and/or loaded. Such a line designed with multiple tracks and individually per track requires an operation of the underlay unit likewise on multiple tracks and individually per track.

Multi-track underlay units are generally known, but are usually so-to-say formed from a plurality of single-track underlay units arranged functionally in parallel, but offset in the longitudinal direction of the line. The products are, for example, fed on multiple tracks, for example two tracks, by means of transport belts to the first underlay unit that provides sheet material for placing beneath the products of a first track. A further transport belt section feeds the products of both tracks to a second underlay unit that provides sheet material for placing beneath the products of the second track before a product outfeed belt follows. In the region of each underlay unit, the transport belt arranged at the feed side is in each case arranged slightly higher vertically than the transport belt arranged at the outfeed side in order to facilitate the placement of sheet material beneath the portion or the placement of the portion on the underlay sheet. Since each underlay unit has such a step, but, for example, the first underlay unit does not provide any sheet material on the second track, there is the risk of tearing for sensitive food portions, such as finely sliced bacon, when such a step is passed without a stabilizing underlay sheet being placed underneath.

A multi-track underlay unit of such a design is naturally very long, i.e. it requires a large total line length since the corresponding functional modules are arranged behind one another. Furthermore, a large amount of space is required beneath the transport line to accommodate the individual material provision units including material storage as well as output units of the individual underlay units. A lateral accessibility, for example for changing the material rolls, also has to be ensured.

Since a plurality of underlay apparatus ultimately have to be installed, such an arrangement is very cost-intensive, in particular since the requirement for parts multiplies with the number of tracks to be served. Maintenance costs are also high since all the belt devices have to be dismantled and cleaned for a hygienic cleaning, whereby the operating time of the total line is simultaneously reduced due to the high time requirement associated therewith.

It is therefore an object of the present invention to provide an underlay unit for a provision individually per track of sheet material, said underlay unit being characterized by a higher economic efficiency and a simpler handling.

This object is specifically satisfied by an output unit, a material provision unit, an underlay unit, an underlay apparatus, and an apparatus for slicing and packaging products as described herein.

An output unit in accordance with the invention for a provision individually per track of sheet material for placing beneath products fed on two or multiple tracks, in particular beneath food portions, has a draw-in device that is configured to draw in individually per track a respective one material web of the sheet material per track and that in particular has at least one driven draw-in shaft and at least one draw-in pressure unit. Furthermore, the output unit has a separation device that is configured to separate the sheet material from the material webs; and an ejection device that is configured to discharge sheet material on two or multiple tracks and that comprises a driven ejection roller and an ejection counter-unit that forms an ejection gap for the sheet material together with the ejection roller, wherein the ejection roller is jointly associated with at least two tracks.

The output unit is therefore configured to provide sheet material on individual tracks, a plurality of tracks, or all the tracks of a food transport line, and indeed individually per track, i.e. for each track independently of the provision on the further tracks, and in particular only when a food portion is actually fed on the respective track. In this way, it is possible to optimally react to the current product availability. The total line can in particular be operated continuously and without a delay even if, for example, disruptions or interruptions of the operation occur on one of the tracks.

The sheet material for all the tracks can, for example, be output through the same ejection gap, i.e. the tracks can, for example, be arranged next to one another in the region of the output unit and can extend in parallel with one another.

Starting from a material storage, the draw-in device, the separation device, and the ejection device are arranged behind one another in this order in the conveying direction of the material webs. For each track, the material webs are advantageously taken from a separate material storage, which is associated with the respective track, for example removed or unwound from a material roll. A drawing in of material webs into the output unit takes place by means of the draw-in device, which has at least one driven, usually rotating, draw-in shaft, in particular, for example, one draw-in shaft per track. In addition, the draw-in device has at least one draw-in pressure unit, in particular one draw-in pressure unit per track.

A material web is guided in the draw-in pressure unit between the driven draw-in shaft and the draw-in pressure unit and can be conveyed, i.e. drawn into the output device, by pressing the draw-in pressure unit and the driven draw-in shaft together such that the material web is entrained and drawn in by the rotating draw-in shaft. The draw-in pressure unit can in this respect likewise comprise one or more rotatable shafts, so-called pressure rollers, that do not have to be driven, however. They are co-rotated by the draw-in shaft on the drawing in of a material web. For a particularly effective contact with the material web, the draw-in shaft and/or the draw-in pressure unit or pressure rollers can, for example, have a rubberized surface.

A drawing in individually per track can take place by draw-in shafts that are designed and driven individually per track and that are only driven when sheet material is to be conveyed on the respective track. Alternatively or additionally, draw-in pressure units that are controllable individually per track can be provided that can establish a conveying contact with the material web depending on requirements. For example, a hydraulic or pneumatic pressure apparatus can be provided to press the draw-in pressure units in the direction of the draw-in shafts. In general, the driven draw-in shaft can also be movably arranged, in particular pneumatically movably arranged, while the draw-in pressure unit is installed in a stationary manner.

The draw-in device further conveys material webs drawn in individually per track to the separation device. The separation device is configured to separate underlay sheets of suitable dimensions from the drawn-in material webs for placing beneath food portions.

The separation device is preferably likewise designed and driven individually per track, i.e. an actuation of the separation device only takes place when a food portion is actually fed on the specific track associated with the separation device.

In general, a simultaneous operation of a common separation device is conceivable for all the tracks if the conveying of sheet material by the draw-in device takes place individually per track and intermittently in adaptation to the actually fed food portions. A separation of underlay sheets then only takes place for the respective tracks for which a material web was fed at all to the separation device by the draw-in device.

The separated or at least perforated sheet material is then discharged by an ejection device, i.e. placed beneath incoming food portions. The conveying of the sheet material takes place by a driven ejection roller and an ejection counter-unit that ensures an entrainment of the sheet material by the ejection roller. The ejection counter-unit can likewise be roller-shaped, but does not itself have to be driven and can, for example, be pneumatically acted on by a force in the direction of the ejection roller to form an ejection gap for the sheet material that is small enough to ensure an efficient entrainment of the sheet material.

The draw-in device and the ejection device can be of similar or substantially identical design, whereby similar parts can advantageously be used.

The ejection roller is jointly associated with at least two tracks of the output unit. An ejection roller jointly associated with the at least two tracks is to be understood such that the sections of the roller associated with the two or more tracks are rotationally fixedly coupled to one another so that they are automatically operated synchronously. The ejection roller can at least partly be formed in one piece; a (possibly rubberized) surface of the ejection roller can in particular be formed in one piece, for example. The ejection roller is preferably associated with all the tracks. Two, a plurality of, or all the tracks are preferably arranged next to one another such that the ejection gaps of all the tracks for the sheet material are disposed on one line. A particularly compact construction shape is thus achieved.

The ejection roller is preferably configured to be driven synchronously at a speed of the product feed and/or of the product outfeed, for example at the speed of a transport belt of the product feed and/or of the product outfeed. A driving of the ejection roller at a discharge speed that deviates slightly from the product speed is also optionally possible, for example, if entrainment effects can thereby be achieved in cooperation with the lower side of the products. This can also only be temporarily provided, for example, only for a first contact between the underlay material and the product.

The synchronization can preferably take place via a control unit of the total line. An intermittent operation or an operation individually per track of the ejection roller is not absolutely necessary since, even when the ejection roller is permanently driven, the conveying rate for the sheet material is predefined by the draw-in device working intermittently and individually per track. Thus, no additional control requirement arises and the number of parts required is reduced, whereby, on the one hand, a cost advantage can be achieved and, on the other hand, the cleaning and maintenance effort of the ejection device is also reduced.

Advantageous embodiments of the invention can be seen from the dependent claims, from the description, and from the drawing.

In accordance with an embodiment, the ejection gap and a draw-in gap, which is formed by the at least one draw-in shaft and the at least one draw-in pressure unit, are disposed in a plane that is arranged at least substantially perpendicular in a position of use of the output unit. The draw-in device and the ejection device can, for example, be arranged above one another in the vertical direction. The plane spanned by the ejection gap and one, more or all of the draw-in gaps can in particular be arranged at least substantially perpendicular to the plane in which the food portions are fed. The output unit can advantageously be arranged beneath the transport path of the food portions such that a conveying direction of the draw-in device for the material webs in particular extends at least substantially upwardly in a perpendicular manner in a position of use of the draw-in device. Due to the arrangement of the draw-in and ejection gaps in one plane, a comparatively compact output unit can be provided that, on the one hand, has a small total length with respect to a transport path of the food portions and, on the other hand, has only a small space requirement beneath the transport path.

The draw-in device can have at least two draw-in shafts, in particular individually driven draw-in shafts, wherein one draw-in shaft is associated with a respective one material web and in particular one track. Alternatively or additionally, the draw-in device can have at least two draw-in pressure units, wherein one draw-in pressure unit is associated with a respective one material web and in particular one track. Thus, the drawing in of material webs can be designed individually per track.

In general, the conveying individually per track of the material web can be designed and controlled in various ways to convey a sheet material only in dependence on actually fed product portions. On the one hand, draw-in shafts controllable individually per track and draw-in pressure units can be provided for each track. In this case, the draw-in gap between the draw-in shaft and the draw-in pressure unit can be so narrow that the draw-in shaft and the draw-in pressure unit are always in engagement with the material web guided therebetween. A drawing in of the material web individually per track can take place by an intermittent driving of the respective draw-in shaft. On the other hand, a larger draw-in gap can, for example, generally be provided between the draw-in shaft and the draw-in pressure unit such that the material web is only loosely guided in the draw-in gap and is not conveyed even when the draw-in shaft is rotating. A conveying can be effected in this design by temporarily pressing together the rotating draw-in shaft and the draw-in pressure unit to such an extent that they enter into engagement with the material web, whereby the material web is drawn in. In this case, either the draw-in shaft or the draw-in pressure unit could generally be jointly associated with a plurality of tracks, while a drawing in of material webs individually per track remains possible.

In accordance with a further embodiment, the separation device comprises at least one blade unit, in particular a rotating blade shaft having at least one separation element. The separation element can be drivable such that it rotates in a conveying direction of the material web to separate sheet material. The blade unit can in particular be drivable and can entrain the separation element installed thereat. The axis of rotation of the separation element can in this respect be arranged outside the separation element and can coincide with the axis of rotation of the blade unit or of the blade shaft.

In this respect, a longitudinal axis of the blade shaft can preferably be oriented perpendicular to the conveying direction of the material web and the separation element can be arranged on the blade shaft such that it grips the material web transversely to its conveying direction, in particular at least substantially over its total width. The separation element can be a blade or a knife that cuts completely through the material web. In general, a complete cutting through of the material web by the separation device does not have to take place, but a perforation of the material web by the separation element can also be sufficient to ensure a subsequent tearing off of the underlay sheet, in particular on a further transport by the ejection device. A rotating blade shaft can also have a plurality of separation elements, for example two or more separation elements, that can be distributed uniformly or at varying angular intervals over the periphery of the blade shaft. In this respect, a symmetrical design and/or a uniform mass distribution on the blade shaft is/are preferably sought after.

To ensure a reliable separation result, the separation device can have a counter-blade for the separation element. The counter-blade can be arranged on the side of the material web disposed opposite the blade unit in order to cooperate with the separation element on the separation of the material web. The counter-blade and the blade unit can thus define a separation gap. For example, the counter-blade can be designed in roll form and can, for example, have a plastic surface. The counter-blade can be coupled to the blade unit, in particular by means of a toothed wheel.

The separation device can be configured to separate sheet material individually per track, wherein the separation device has at least two individually driven blade units, wherein one blade unit is associated with a respective one material web. A blade unit can in particular be associated with each track. It is thus also conceivable that underlay sheets of different sizes are separated from the material webs individually per track in order, for example, to provide suitably dimensioned underlay sheets for different products or portions, in particular portions of different lengths, on different tracks, which increases the versatility of the output unit. In addition thereto, it is also possible to provide a control loop by which the lengths of the associated underlay sheets are adapted on the basis of the lengths of the incoming portions (for example, detected by one or more sensors).

The at least two draw-in shafts can be coaxially arranged. Alternatively or additionally, the shafts of pressure rollers of the at least two draw-in pressure units are coaxially arranged and/or the blade shafts of the at least two blade units are coaxially arranged. If more than two draw-in shafts, shafts of pressure rollers, or blade shafts are present, all similar shafts of the same unit are preferably coaxially arranged in each case. A particularly compact design of the output unit thus results that reduces the total length with respect to the transport direction of the food portions and simultaneously reduces the vertical height of the output unit. It is also conceivable that the groups of draw-in shafts, draw-in pressure units, and/or blade units are not coaxially arranged in each case, but are slightly offset vertically in height. For a compact design, the draw-in gaps can then advantageously be arranged in one plane.

Furthermore, the separation gap formed by the blade unit and the counter-blade can advantageously be disposed in one plane with the draw-in gap of the draw-in device and the ejection gap of the output device, or can be at least approximately aligned with the draw-in gap and the ejection gap. An even more compact construction shape of the output unit thus results.

In accordance with a further embodiment, the output unit is designed in a modular manner as an output module. Alternatively or additionally, the draw-in device, the separation device, and/or the ejection device is/are in each case designed in a modular manner as a draw-in module, a separation module, and/or an ejection module, in particular wherein each of the modules has its own frame or its own housing. For example, the output module can have reception sections into which the part modules, i.e. the draw-in module, the separation module and/or the ejection module, can be introduced, in particular can be pushed. The part modules can be fixable to a frame or a housing of the output module. The output module itself can in turn be arranged such that it can be pushed in between or beneath a product feed and a product outfeed.

An output unit having such a modular character of the unit itself or of the included devices enables a simple retrofitting of existing systems with an output unit and additionally simplifies the maintenance, repair, and cleaning, wherein in particular a tool-free assembly or dismantling of the part modules and/or of the output module can be provided for a particularly simplified handling. In addition, a pulling out of the modules toward an operating side of the output unit, in particular transversely to the conveying direction of a product feed, can be provided that additionally facilitates this work.

The output unit, the draw-in device, the separation device, and/or the ejection device can in each case comprise at least one drive unit, in particular an electric motor, that is configured to drive the corresponding unit or device.

The draw-in device and/or the separation device or the draw-in module and/or the separation module preferably each have a separate drive unit per track. In the ejection device, the number of drive units is preferably smaller than that of the tracks; the number of drive units is in particular exactly 1 since the ejection roller is associated with at least two tracks, in particular with all the tracks.

The ejection device can have a mechanical interface by means of which the ejection roller can be drive-effectively coupled to an external drive unit. For example, the ejection device can be coupled to a drive of a transport unit by means of which the products underlaid with the sheet material are fed and/or discharged. For example, the output device has a belt pulley that can be coupled to a drive belt that is driven by a drive of a conveyor belt. Thus, the ejection speed of the ejection device can be directly synchronized with a conveying speed of a product outfeed and/or of a product feed.

The present invention further relates to a material provision unit for a provision individually per track of material webs of sheet material for placing beneath products fed on two or multiple tracks, in particular beneath food portions, in particular by means of an output device such as has been described above. In accordance with the invention, a material provision unit has a material storage, comprising a common reception shaft for receiving at least two material web rolls from each of which a material web of the sheet material can be removed, in particular wherein a respective one material web roll is associated with a track on which sheet material can be provided; and a removal device that is configured to remove material webs from the at least two material web rolls.

A material provision unit in accordance with the invention has extremely compact dimensions since the material web rolls that are required for providing sheet material for two or more tracks are arranged in a space-saving manner on a common reception shaft. In this respect, the material web rolls are preferably individually supported such that the removal of material webs can take place individually and independently of the other material web rolls for each material web.

The removal device for removing material webs from the material web rolls is preferably configured to remove material webs individually per track from individual material web rolls such that the material webs can then, for example, be fed to a draw-in device that feeds sheet material required individually per track into an output unit.

In accordance with an embodiment, the removal device has a removal shaft, which is jointly associated with the at least two material webs, and at least one removal pressure unit per material web roll, said removal shaft and at least one removal pressure unit together forming a respective one removal gap for the respective material web. An unwinding or removal of material webs from the material web rolls thus only takes place for the material web rolls for which the removal gap between the removal pressure unit and the removal shaft is so small that the respective material web is pressed against the removal shaft and entrained by it. This adaptation of the removal gap can, for example, be achieved by a pressing, in particular a pneumatic pressing, of the removal pressure unit against the removal shaft. The removal of material webs can thus be controlled individually per track.

The removal shaft can be a driven, rotating shaft. Each removal pressure unit can comprise at least one pressure shaft, wherein the pressure shafts of a plurality of removal pressure units, which are each associated with a material web, are preferably aligned coaxially to one another, in particular in a pressure position. To ensure a particularly reliable entrainment of the material web, the removal shaft and/or the removal pressure unit can have a suitable surface property, for example, a rubberized surface.

Alternatively or additionally, the removal device can also have a plurality of removal shafts, in particular one removal shaft per material web roll. In the latter case, a removal individually per track of material webs can then also take place when the removal gap is constantly narrow in that an intermittent driving of the removal shaft only takes place when sheet material is to be provided.

In accordance with a further embodiment, the material provision unit is designed in a modular manner as a material provision module, in particular wherein the material storage and/or the removal device is/are in each case designed in a modular manner as a material module and/or a removal module, in particular wherein each of the modules has its own frame or its own housing. For example, the material module and/or the removal module can be insertable into, in particular can be pushed into, a frame or a housing of the material provision module. Furthermore, the material provision module can itself be insertable such that it can be pushed in between a product feed and a product outfeed, in particular in combination with an output unit, in particular an output module.

Due to a material provision unit having such a modular character, a simple retrofitting of existing systems with the space-saving, multi-track material provision unit that can be operated individually per track is easily possible. A pulling out of the material provision module, the material module, and/or the removal module toward an operating side of the material provision unit, for example transversely to the conveying direction of a product feed, enables easy access to the modules by an operator such that maintenance work, a replacement of the material web rolls, and repair and cleaning work are simplified, wherein, for example, a tool-free assembly or dismantling of the part modules and/or of the material provision module can be provided for a particularly simplified handling.

The removal device preferably comprises at least one drive unit for driving the removal device, in particular an electric motor. Each removal shaft in particular has a separate drive unit. The removal pressure units do not have to be driven, but can also be configured as co-rotating passively.

A further aspect of the invention relates to an underlay unit for a provision individually per track of sheet material for placing beneath products fed on two or multiple tracks, in particular beneath food portions, said underlay unit comprising an output unit such as has been described above; and a material provision such as has been described above, in particular wherein the underlay unit is designed in a modular manner as an underlay module that has its own frame or housing.

With the underlay unit in accordance with the invention, the advantages described above of the output unit and of the material provision unit can be particularly effectively combined with one another. The resulting underlay unit thus enables a multi-track underleaver operation that can be controlled individually per track, while the construction shape of the underlay unit is kept very compact at the same time. A retrofitting of such an underlay unit is thus easily possible for existing lines due to the small space requirement of the underlay unit. In addition, an underlay module can be very easily removed from an existing line for slicing and/or packaging food products if, for example, an operation of the line without the underleaver function is desired. A particularly great flexibility and versatility thus results due to an underlay module.

In accordance with an embodiment, the underlay unit has a sheet material detection device that is configured to detect individually per track an amount of sheet material provided by the material provision unit, in particular by means of at least one ultrasound sensor, and to regulate a provision speed of the material provision unit in dependence on the amount of sheet material provided. By means of such a sheet material detection device, the provision speed of the material provision unit can be adapted to the sheet material requirement in ongoing operation without further mechanical designs, such as the known dancer or dancing rollers, being necessary. A separate sheet material detection device is advantageously provided per material web roll such that the amount of sheet material already provided is detected individually per track and can be adapted to the requirement. For example, after passing through the removal shaft, the sheet material provided can extend in a loop-like manner in the direction of the draw-in device, wherein a sensor, for example an ultrasound sensor, detects the size of the loop. Such a sheet material detection device not only saves parts and thus costs, but also simplifies the total design, whereby installation space can be saved and maintenance and cleaning can be facilitated.

A further aspect of the present invention relates to an underlay apparatus for a provision individually per track of sheet material for placing beneath products fed on two or multiple tracks, in particular beneath food portions. In accordance with the invention, the underlay apparatus has a product feed that is configured to feed the products on two or multiple tracks to a sheet feed region, in particular wherein the product feed is configured as a belt device; an underlay unit such as has been described above; and a product outfeed that is configured to lead the products away from the sheet feed region on two or multiple tracks, in particular wherein the product outfeed is configured as a belt device. The product feed and the product ouffeed can be at least substantially disposed in one plane.

The product feed and/or the product outfeed can, for example, be transport belts, in particular wherein all the provided conveyor belts are individually drivable. The sheet feed region is in particular a gap that is aligned with the ejection gap that is particular arranged below said gap.

The belt devices of the product feed and/or of the product outfeed are configured for the transport of food portions on two or multiple tracks. For example, each track can be defined by a separate transport belt that predefines the transport path of the track with its belt course. In this case, a plurality of tracks can, for example, be defined by a plurality of transport belts that e.g. extend in parallel with one another or independently of one another on individual transport paths. However, a plurality of tracks can also share a transport belt, wherein the tracks can be arranged next to one another on the transport belt such that food portions placed thereon move in the same manner in each case. Alternatively or additionally, a transport belt can itself also be movable as a whole in addition to its conveying movement, for example displaceable perpendicular to the conveying direction, whereby different tracks can possibly also be defined by the same transport belt that transports individual portions to different locations, for example to different tracks of the sheet feed region, at different points in time.

The output unit, in particular the ejection device, can be drive-effectively coupled to the product outfeed and/or the product outfeed can be drive-effectively coupled to the output unit, in particular to the ejection device. Such a mechanical coupling of the output unit and the product outfeed is in particular advantageous since in this way an automatic synchronization in time of the output of the sheet material with the product outfeed and/or an automatic coordination of the speed of the output sheet material and of the product outfeed takes place. In this way, an optimal placement of sheet material beneath the product can be achieved at the transition to the product outfeed, in particular on the transition to a product outfeed belt. Alternatively, a control device can also be used to synchronize the speeds.

The underlay apparatus can advantageously comprise a sensor device that is configured to detect individually per track the requirement for the provision of sheet material, in particular by a detection individually per track of products in a region of the product feed. A sensor device can in this respect make use of generally known and suitable sensor technology, for example scales, image capture, light barriers, or further generally known sensors. Alternatively or additionally, corresponding information can be provided by other sources.

The underlay apparatus can comprise a control device that is configured to adapt the provision individually per track of the sheet material to the actual requirement, in particular based on a detection individually per track of products in the region of the product feed, and/or to control the feed and/or the outfeed of products into and/or from an underlay region.

Information of the sensor device regarding on which track a food portion enters the sheet feed region at what point in time can be used by the control device to cause the timely discharge of sheet material on the corresponding track, for example, by instructing the material provision unit to provide the required material webs and instructing the output unit to draw in, separate, and output the required material webs. By means of a sensor device and/or the control device, it is thus possible to react in a highly flexible manner to the food portions actually available on the individual tracks, whereby the maximum performance of the line can be exploited.

A further aspect of the present invention relates to an apparatus for slicing and packaging products, in particular food portions, comprising at least one cutting apparatus, in particular a high-performance slicer, for slicing the product; an underlay apparatus such as has been described above, wherein the product feed receives portions of the sliced product; and a packaging apparatus, in particular a deep-draw packaging machine, for packaging the portions underlaid with sheet material.

The above-described advantages of the underlay apparatus and its units can be advantageously combined in the apparatus for slicing and packaging products. In this way, the performance of the apparatus, if necessary with a plurality of high-performance slicers, can be optimally utilized while an underlaying of food portions with sheet material on multiple tracks and controlled individually per track is simultaneously implemented with small space requirements.

An underlay apparatus of the type described above is in particular configured such that the functionality of a conventional grouping belt is also provided. In corresponding embodiments, the sensors required for this purpose for determining the position of the products or portions are namely present on the individual tracks of the product outfeed and/or product feed and the individual tracks are individually controllable. On the basis of the data of said sensors, it is, for example, possible to control the individual tracks such that the products or portions on the tracks are arranged at the same height.

BRIEF DESCRIPTION OF THE DRAWINGS

The invention will be described in the following purely by way of example with reference to the drawing. There are shown.

DETAILED DESCRIPTION

Figure 1:
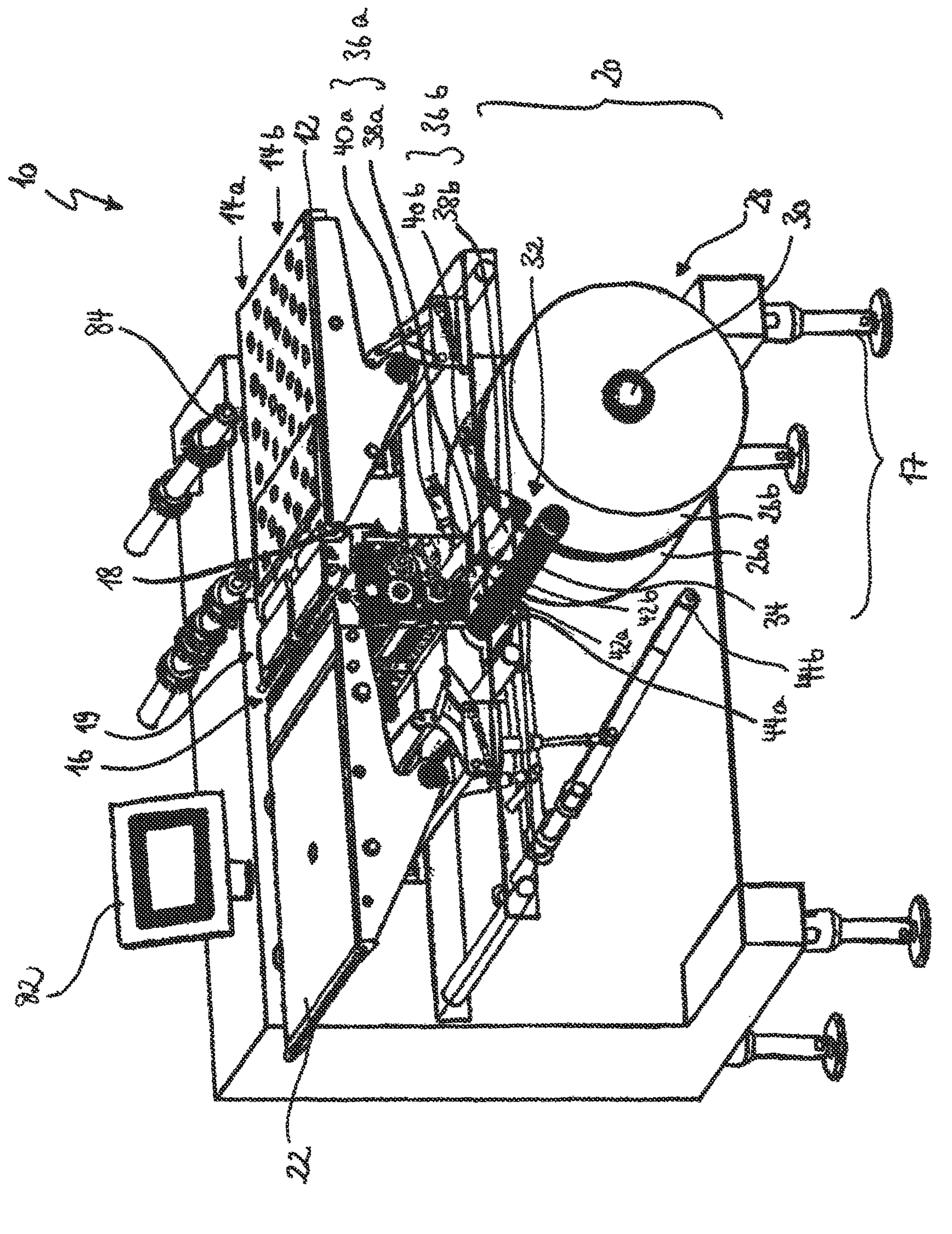
FIG. 1 a perspective side view of an underlay apparatus with a material provision unit and an output unit in accordance with a first embodiment.

FIG. 1 shows an underlay apparatus 10 for a multi-track provision individually per track of sheet material for placing beneath food portions fed on two tracks. The underlay apparatus 10 comprises a product feed 12 for transporting food portions (not shown) on a first track 14*a* and a second track 14*b*. The feed 12 comprises a transport belt, not shown. On the belt of the product feed 12, the food portions enter into a sheet feed region 16 of an underlay unit 17. In the sheet feed region 16, sheet material is fed to both tracks 14*a* and 14*b* for placing beneath the food portions. Via a product outfeed 22 (the corresponding belt is not shown), the food portions underlaid with sheet material are led away from the sheet feed region 16 and are furthermore grouped into two tracks 14*a*, 14*b*.

The underlay apparatus 10 can be included in a line for slicing and packaging food products. Such a line usually comprises at least one cutting apparatus (not shown) that is arranged upstream of the product feed 12 and that slices fed product bars such that the sliced food portions come to rest on the product feed 12 or on a conveying or sorting line arranged upstream thereof, whereupon they are fed to the underlay unit 17. High-performance slicers are frequently used as cutting apparatus and slice one or more product bars on one or more tracks. In the case of a single-track slicing, the portions can be divided over two or more tracks by a suitable sorting line.

Such a line for slicing and packaging food products can further comprise a packaging apparatus (not shown) that adjoins the product outfeed 22 and that packages the food portions underlaid with underlay sheets in an automated manner. The packaging apparatus can, for example, be a deep-draw packaging machine for a single-track or multi-track packaging of food portions. Between the product outfeed 22 and the packaging apparatus, further conveying and sorting devices can be provided that, for example, suitably group the food portions or combine individual part portions to form complete food portions before they are packaged.

The placing underneath of the sheet material takes place in the sheet feed region 16 as follows: A food product that is fed to the sheet feed region 16 on the belt of the product feed 12 first passes through a position correction 19 that optimally aligns the portion. In the adjoining sheet feed region 16, underlay sheets are guided into the transport path of the food portions, i.e. into the tracks 14*a*, 14*b*, by an underlay unit 17, which is arranged beneath the product feed belt 12 in a position of use, and indeed at just that point in time at which the correctly aligned food portions enter into the sheet feed region 16 after the position correction 19.

The fed underlay sheets are entrained by the food portions transported in the direction of the product outfeed 22 on the transition over the sheet feed region 16.

The food portions then come to rest on the underlay sheets on the product outfeed 22. For an optimal placement of the food portions on the underlay sheets, they are output by the underlay unit 17 just at the speed at which the belt of the product outfeed 22 leads the food portions away from the sheet feed region 16.

Figure 4:
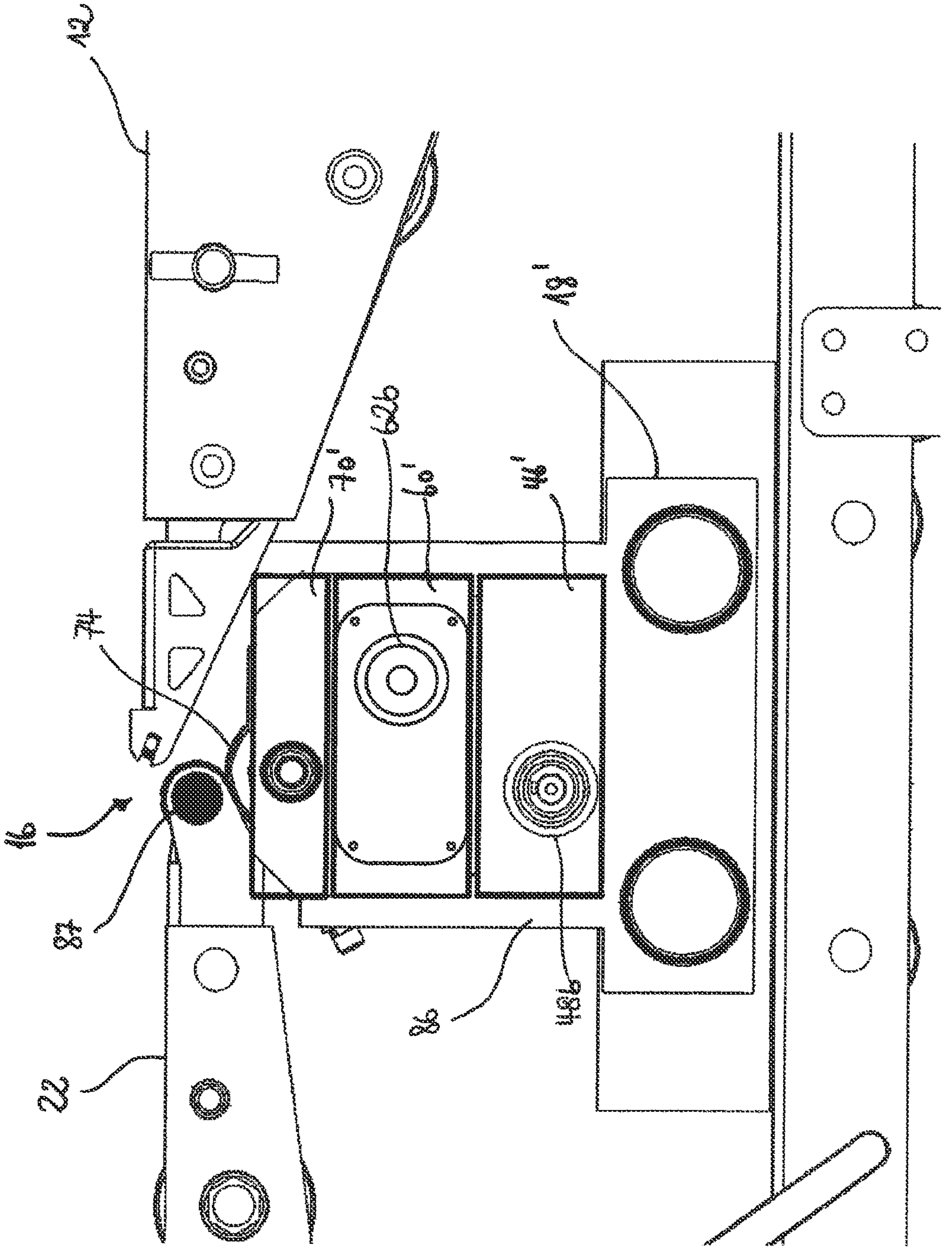
FIG. 4 a side view of an output module in accordance with a fifth embodiment.

On the transition from the belt of the product feed 12 to the belt of the product outfeed 22, the food portion passes through a small step, i.e. a vertical offset is provided between the product feed belt 12 and the product outfeed belt 22 in the region of the sheet feed region 16 (see also FIG. 4). However, it is also possible to design the transition between the product feed belt 12 and the product outfeed belt 22 such that both transport belts 12, 22 are at least substantially in one plane.

The underlaying of sheet material by the underlay unit 17 is controllable individually per track by the underlay apparatus 10 shown, i.e. the provision and the underlaying of sheet material on the first track 14*a* are possible independently of the provision and the underlaying of sheet material on the second track 14*b*, and vice versa. In the following, the multi-track underleaver function individually per track is explained using the example of the two-track operation shown in FIG. 1. The underleaver shown can, however, also be operated with more than two tracks by a comparatively simple conversion. The respective operating mode is, for example, dependent on the products to be sliced, on the conveying and sorting devices connected downstream, and on the type of packaging or the packaging machine.

For each of the tracks 14*a* and 14*b*, the provision of the sheet material comprises removing material webs 24*a* and 24*b* (see, for example, FIG. 3) from a respective material web roll 26*a* and 26*b*. For this purpose, the underlay unit 17 has a material provision unit 20 for a provision individually per track of material webs 24*a*, 24*b* (see, for example, FIGS. 3, 5) of sheet material. A first material web roll 26*a* is associated with the first track 14*a* and a second material web roll 26*b* is associated with the second track 14*b* and they are stored together in a material storage 28 that is arranged beneath the product feed 12. The material storage 28 comprises a reception shaft 30 that jointly receives the two material web rolls 26*a*, 26*b*. For this purpose, the material web rolls 26*a*, 26 have a roll core that is configured to receive the reception shaft 30. The material web rolls 26*a* and 26*b* are rotatably supported on the reception shaft 30 in a mutually independent manner such that the removal of material webs 24*a*, 24*b* can take place completely individually per track.

For each track 14*a*, 14*b*, the removal of the material web 24*a*, 24*b* associated with the respective track from the material web roll 26*a*, 26*b* comprises the unwinding by means of a removal device 32. The removal device 32 comprises a driven removal shaft 34 that extends over the width of both material web rolls 26*a*, 26*b* and that is jointly associated with both material web rolls 26*a*, 26*b* to remove respective material webs 24*a*, 24*b* therefrom. The removal device 32 can have its own drive unit for driving the removal shaft 34. The removal shaft 34 has a rubberized surface such that a good contact with a material web 24*a*, 24*b* to be rolled off is ensured.

For the removal, which can be controlled individually per track, of the material webs 24*a*, 24*b* from the material web rolls 26*a* and 26*b*, the removal device 32 has two removal pressure units 36*a*, 36*b* of which the first removal pressure unit 36*a* is associated with the first material web roll 26*a* and the second removal pressure unit 36*b* is associated with the second material web roll 26*b*. The removal pressure units 36*a*, 36*b* each comprise a rotatably supported pressure shaft 38*a*, 38*b*, which has a rubberized surface, and a pneumatic apparatus 40*a*, 40*b*. A respective removal gap 42*a*, 42*b*, through which the respective material web 24*a*, 24*b* is guided, is defined by the removal shaft 34 and the pressure shafts 38*a*, 38*b*.

For each material web roll 26*a* and 26*b*, the removal of the respective material web 24*a*, 24*b* takes place in that the respective pressure shaft 38*a*, 38*b* is pressed against the rotating removal shaft 34 by the respective associated pneumatic apparatus 40*a*, 40*b*. The removal gap 42*a*, 42*b* is thereby reduced to such an extent that the respective pressure shafts 38*a*, 38*b* and the removal shaft 34 enter into engagement with the material webs 24*a*, 24*b*, whereby the material webs 24*a*, 24*b* are entrained by the removal shaft 34 and are thus unwound from the respective material web rolls 26*a*, 26*b*. The control of the pressing of the pressure shafts 38*a*, 38*b* can in this respect be controlled individually per track, i.e. the pressure shafts 38*a*, 38*b* can be pressed against the removal shaft 34 independently of one another such that the material web 24*a* and the material web 24*b* can be removed individually and independently of one another from the respective material web roll 26*a*, 26*b*.

The removed material webs 24*a*, 24*b* are first each guided via a dancer roller or dancing roller 44*a*, 44*b*, said dancer or dancing rollers 44*a*. 44*b* also keeping the tension of the material webs 24*a*, 24*b* constant in the case of fluctuations in the material web length and forming a store for the removed sheet material.

Figure 2A:
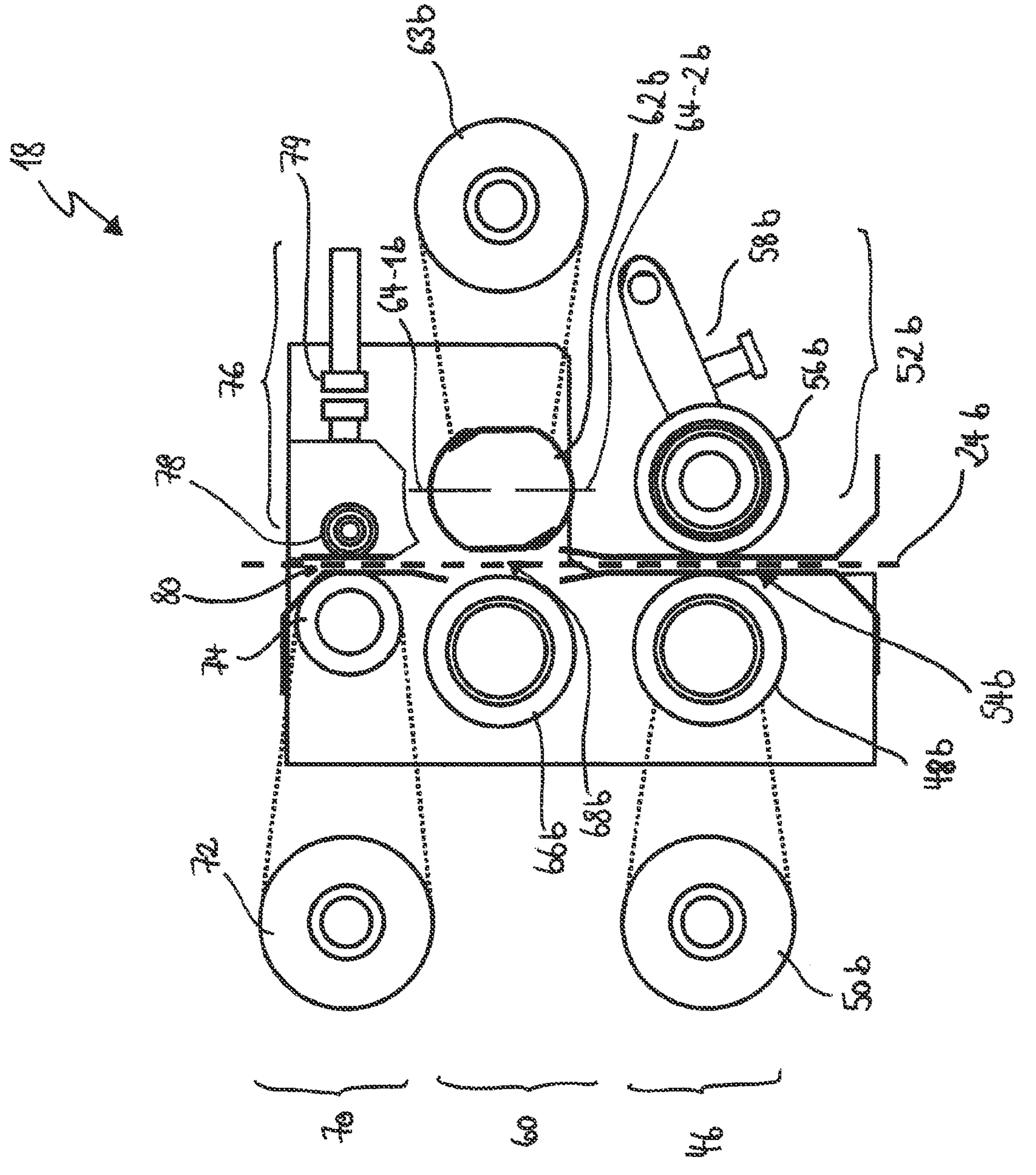
FIG. 2A a side view of an output unit in accordance with a second embodiment.

The provision of the sheet material for placing beneath food portions in the sheet feed region 16 of the underlay apparatus 10 comprises the outputting individually per track of sheet material by an output unit 18 such as is shown in a schematic side view in FIG. 2A. In the side view, only one material web 24, here for example the material web 24*b*, and the components of the output unit 18 associated with it are shown in each case. Nevertheless, the output unit 18 is configured to output two material webs 24*a*, 24*b* that will be explained in the following with reference to FIG. 2A.

The material webs 24*a*, 24*b* are removed from the associated dancer roller 44*a*, 44*b* by a draw-in device 46 and are drawn into the output unit 18. This takes place individually per track, i.e. for each track 14*a*, 14*b* and the respective associated material web 24*a*, 24*b* independently of a drawing in on the other track, and in dependence on whether and when a food portion is fed on the associated track 14*a*, 14*b*. This can be determined by suitable sensor devices. The draw-in device 46 has two draw-in shafts 48*a* and 48*b* that are associated with the material webs 24*a*, 24*b*. In the side view of FIG. 2A, only the second draw-in shaft 48*b* is shown. The first draw-in shaft 48*a* projects into the plane of the drawing and is therefore not visible. In connection with FIG. 1 and FIG. 5, the three-dimensional arrangement becomes clear, however. The draw-in shafts 48*a* and 48*b* are coaxially arranged and are each individually drivable by means of a drive 50*a*, 50*b*, for example by means of an electric motor, that is coupled to the associated draw-in shaft 48*a*, 48*b* by means of a drive belt in each case.

The draw-in device 46 additionally has two draw-in pressure units 52*a* (not shown) and 52*b* that are each associated with the material webs 24*a*, 24*b*. The draw-in pressure units 52*a* and 52*b* are each arranged opposite the draw-in shafts 48*a* and 48*b* and beyond the material webs 24*a*, 24*b* and thus each define a draw-in gap 54*a* and 54*b*, through which the material webs 24*a* and 24*b* are guided, together with the draw-in shafts 48*a* and 48*b*. The draw-in pressure units 52*a*, 52*b* each comprise a rotatably supported pressure roller 56*a*, 56*b* for pressing the material webs 24*a*, 24*b* against the draw-in shafts 48*a*, 48*b*. For this purpose, a pneumatic system 58*a*, 58*b* individually per track or another suitable mechanical system is provided in each case. For an effective contact with the material webs 24*a*, 24*b*, the draw-in shafts 48*a*, 48*b* as well as the pressure rollers 56*a*, 56*b* preferably have a rubberized surface. In the embodiment example shown, the material webs 24*a*, 24*b* are each continuously pressed against the draw-in shafts 48*a*, 48*b* by means of the pressure rollers 56*a*, 56*b*. The pressure rollers 56*a*, 56*b* are coaxially arranged in the embodiment example shown.

In this case, a drawing in of the material webs 24*a*, 24*b* individually per track takes place in that, depending on food portions actually fed on the tracks 14*a*, 14*b*—which are each associated with the material webs 24*a*, 24*b*—the draw-in shafts 48*a*, 48*b* are driven as required in order to convey sheet material. Therefore, the drives 50*a*, 50*b* are intermittently operated independently of one another to draw sheet material into the output unit 18 only when necessary.

Subsequent to the draw-in device 46, the drawn-in material webs 24*a*, 24*b* pass through a separation device 60 that separates sheet material from the material webs such that individual underlay sheets for placing beneath individual food portions are obtained. The separation device 60 is also configured for an operation individually per track. For this purpose, it comprises a blade unit for each material web 24*a*, 24*b*, said blade unit comprising a respective one rotatable blade shaft 62*a*, 62*b* in the specific case. The blade shafts 62*a*, 62*b* are each intermittently drivable independently of one another by means of a drive 63*a*, 63*b*, here by means of an electric motor, when underlay sheets are to be provided on the corresponding track. A respective two separation elements 64-1*a*, 64-2*a* and 64-1*b*, 64-2*b* are arranged with an angular offset of 180° on the blade shafts 62*a*, 62*b*. In the embodiment example shown, the blade shafts 62*a* and 62*b* are coaxially arranged, wherein again only the blade shaft 62*b* is shown since the blade shaft 62*a* is arranged behind the plane of the drawing.

The separation elements 64-1*a*, 64-2*a* and 64-1*b*, 64-2*b* are knives that are configured to cut through or at least to perforate the material webs 24*a*, 24*b* such that individual underlay sheets are separated from the sheet material of the material webs 24*a*, 24*b*. At the side of the material webs 24*a*, 24*b* that is disposed opposite each of the blade shafts 62*a*, 62*b*, a respective counter-blade 66*a*, 66*b* is arranged that is intended to ensure a constant cutting result of the separation device 60. The counter-blades 66*a*, 66*b* are, for example, each configured as shafts that have plastic jackets and that, together with the blade shafts 62*a*, 62*b*, each define a separation gap 68*a*, 68*b* in which the material webs 24*a*, 24*b* are guided and separated. For an optimal cutting result, the counter-blades 66*a*, 66*b* can each be coupled to the associated blade shafts 62*a*, 62*b*, for instance, by means of a toothed wheel.

A rotation of the respective associated blade shafts 62*a*, 62*b* can be brought about by the drives 63*a*, 63*b* such that the separation elements 64-1*a*, 64-2*a* and 64-1*b*, 64-2*b* co-rotate, for example, such that they move in the conveying direction of the material webs 24*a*, 24*b*, i.e. upwardly in FIG. 2, in the region of the separation gap 68*a*, 68*b*. If the blade shaft 64-2*b* shown in FIG. 2A is rotated by 90° from the position shown, the knife 64-2*b* enters into engagement with the material web 24*b* that is cut through on the holding against of the counter-blade 66*b*.

Sheet material that has passed through the separation device 60, i.e. the finished underlay sheets, is then discharged from the output unit 18 into the sheet feed region 16 of the underlay apparatus 10 by means of an ejection device 70. The discharge by the ejection device 70 takes place simultaneously on both tracks 14*a* and 14*b*, i.e. an operation of the ejection device individually per track is not provided and not necessary.

The discharge of the sheet material by the ejection device 70 takes place by an ejection roller 74 driven by means of a drive 72, here by means of an electric motor, and an ejection counter-unit 76 that comprises a pressure roller 78 that is pneumatically pressed in the direction of the ejection roller 74 by a corresponding pneumatic system 79. The pressure roller 78 and the ejection roller 74 preferably each have a rubberized surface. The pressure roller 78 and the ejection roller 74 together define an ejection gap 80 for the sheet material of the material webs 24*a* and 24*b*, i.e. the ejection roller 74 is jointly associated with all the tracks 14*a*, 14*b* to be supplied with sheet material individually per track.

In the embodiment example shown, the pressure roller 78 is permanently pneumatically pressed against the ejection roller 74 while the ejection roller 74 is constantly operated at the belt speed of the product feed belt 12 and the product outfeed belt 22. Nevertheless, a provision individually per track of sheet material is achieved by the output unit 18 since the conveying rate individually per track is already predefined by the draw-in device 46. Even in the case of a cross-track operation of the ejection device 70, sheet material is in each case only provided on that track 14*a*, 14*b* where the draw-in device 46 has drawn in sheet material and the separation device 60 has separated underlay sheets.

The output unit 18 therefore conveys the sheet material of the material webs 24*a*, 24*b* upwardly in a perpendicular manner from beneath the product feed plane, wherein the draw-in gaps 54*a*, 54*b*, the separation gaps 68*a*, 68*b*, and the ejection gap 80 are arranged in a common plane (see FIG. 2A). This requires a very compact construction shape of the output unit 18 that is further compacted by a respective coaxial arrangement of the two blade shafts 62*a*, 62*b*, the two draw-in shafts 48*a*, 48*b*, and the associated counter-blades 66*a*, 66*b*, and pressure rollers 56*a*, 56*b*. Thus, the output unit 18 is accommodated without problem beneath the product feed belt 12 of the underlay apparatus 10 (see FIG. 1).

Figure 2B:
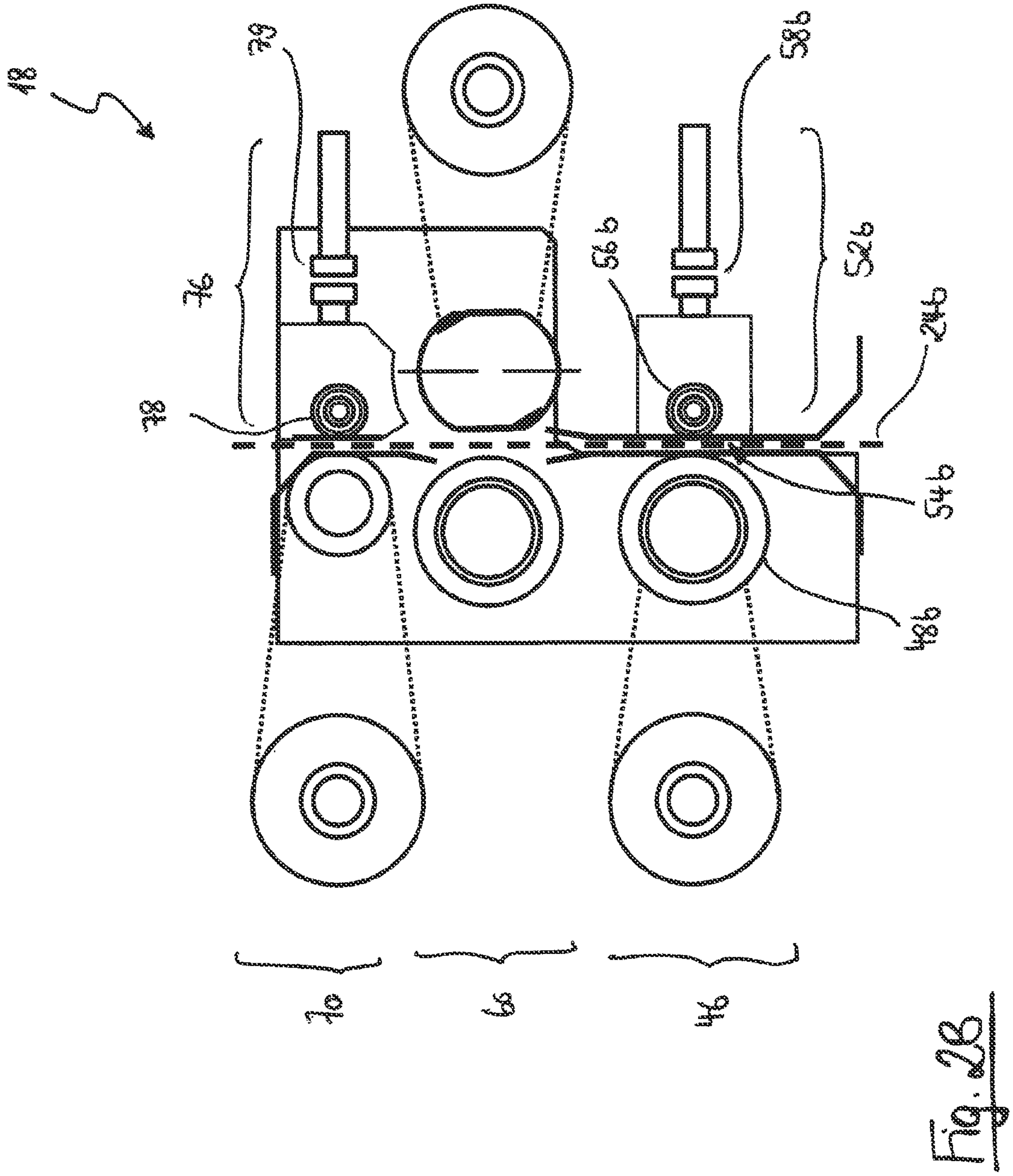
FIG. 2B a side view of an output unit in accordance with a third embodiment.

FIG. 2B shows an output unit 18 in accordance with a further embodiment that differs from the output unit 18 in FIG. 2A only with respect to the design of the draw-in pressure units 52*a*, 52*b*. In accordance with the embodiment in FIG. 2B, the draw-in pressure units 52*a*, 52*b* are designed in the same way as the ejection counter-unit 76 of the output unit 18. A unified control of both units is thereby provided, on the one hand, and an advantageous unification with respect to maintenance, repair, cleaning and replacement is provided, on the other hand.

The interplay of the individual above-described functional units of the multi-track underleaver having individual tracks, for example therefore the cooperation of the material provision unit 20 and the output unit 18 of the underlay unit 17 as well as the underlay unit 17 with the product feed 12 and the product outfeed 22 of the underlay apparatus 10 as well as the cooperation of the underlay apparatus 10 with functional units of a slicer and of a packaging machine, is controlled by a control device 82 (see FIG. 1) that is a central control device 82 of the underlay apparatus 10 in the embodiment shown (see, for example, FIG. 1). With respect to the underlay unit 17, it is thus so-to-say an external control device. However, the underlay unit 17 can also have an internal control device that cooperates with a control device 82 of the underlay apparatus 10 or a control device of the total line for slicing and packaging.

The control device 82 (or a higher-ranking control device) controls, among other things, the belt drives of the product feed 12 and the product outfeed 22, but also the drives of the removal shaft 34 of the material provision unit 20 and of the draw-in shafts 48*a*, 48*b* of the output unit 18, and thus ultimately determines how much material is rolled off from the material web rolls 26*a*, 26*b* per unit of time and how much material of the material webs 24*a*. 24*b* is drawn into the draw-in device 46 for which track 14*a*, 14*b* and is thus ultimately output by the output unit 18 into the sheet feed region 16.

The track-specific material requirement in the sheet feed region 16 is determined by the control device 82 and is ensured by a corresponding track-specific control of the removal device 32, the draw-in device 46, and the separation device 60. To decouple the highly dynamic output of sheet material into the sheet feed region 16 by the output unit 18 from the rolling off of material webs 24*a*, 24*b* from the relatively inert material web rolls 26*a*, 26*b*, the control device 82 also always ensures that a sufficient supply of sheet material per track 14*a*, 14*b* is stored on the dancer or dancing rollers 44*a*, 44*b* at all times to be able to provide the required sheet material on the tracks 14*a*, 14*b* at short notice.

To detect the requirement individually per track for the provision of sheet material, the underlay apparatus 10 comprises a corresponding sensor device 84 that is arranged in the region of the product feed 12 and that detects individually per track on which track 14*a*, 14*b* food portions are fed to the sheet feed region 16. For this purpose, the sensor device 84 has a respective associated suitable sensor 85*a*, 85*b* for detecting food portions for each track 14*a*, 14*b*. Based on this information of the sensor device 84, the control device 82 controls the drives of the material provision unit 20 and of the output unit 18 in a suitable manner.

The drive 72 of the ejection roller 74 is in particular controlled by the control device 82 such that the discharge of the sheet material takes place adapted to the speed of the belt of the product outfeed 22. For example, the discharge speed of the sheet material and the speed of the belt of the product outfeed 22 are substantially the same.

Alternatively, it is also possible to provide a mechanical coupling between the belt of the product outfeed 22 and the ejection roller 74 and to drive these functional units using a common drive unit. For example, this coupling can take place by means of a corresponding roller 87 or a toothed wheel of the product feed belt that is in engagement with the ejection roller 74 or a toothed wheel 87 coupled thereto (see FIG. 4). Thus, a direct mechanical coupling of the speeds of the product outfeed belt 22 and/or of the product feed belt 12 and of the ejection roller 74 is ensured.

Figure 3:
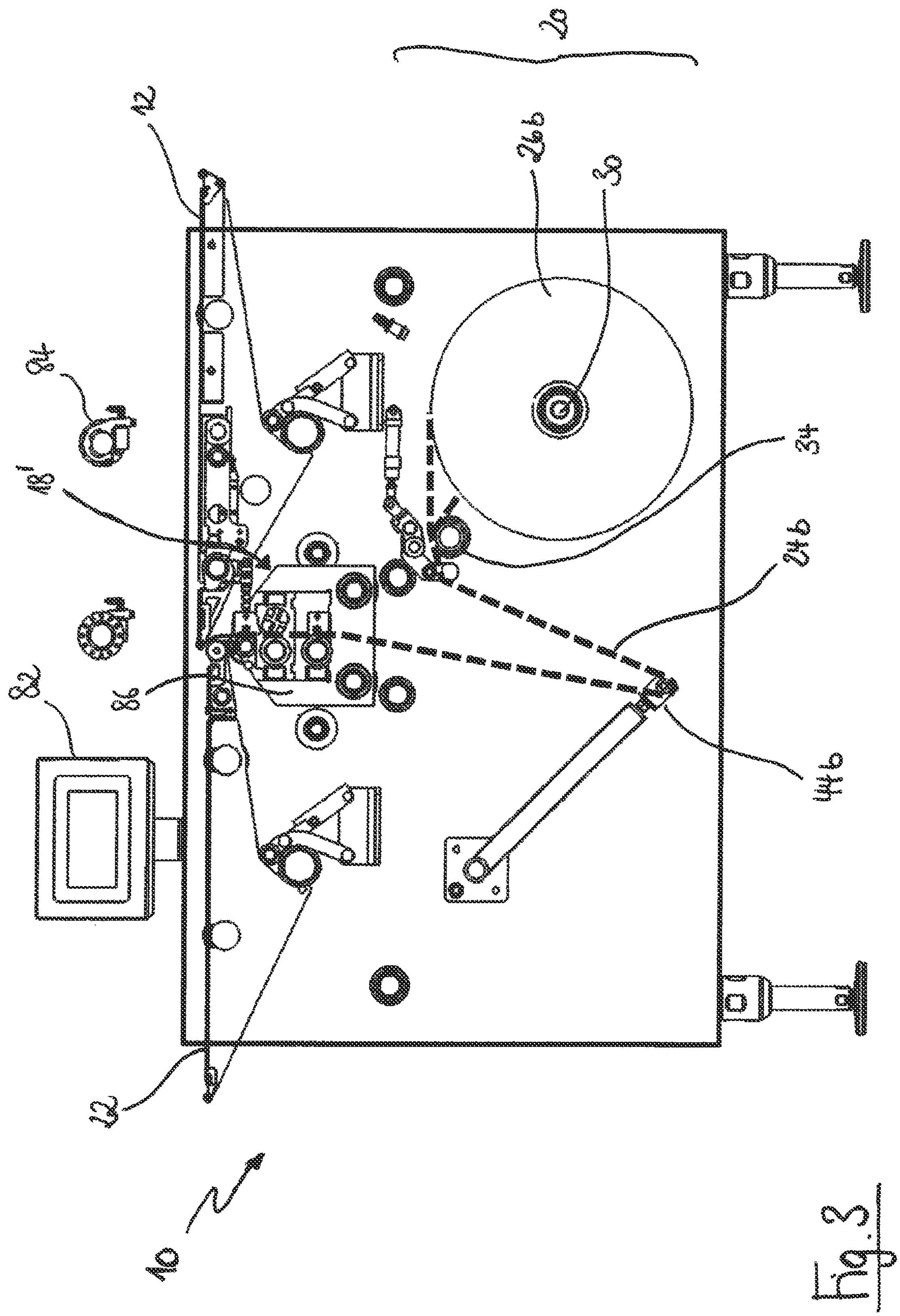
FIG. 3 a side view of an underlay apparatus with an output module and a material provision unit in accordance with a fourth embodiment.

FIG. 3 shows a side view of an underlay apparatus 10 in accordance with a further embodiment that is largely comparable to the underlay apparatus 10 in accordance with the first embodiment of FIG. 1. The material provision unit 20, the dancer rollers 44*a*, 44*b*, and the product feed belt 12 and the product outfeed belt 22 are in particular at least substantially configured as described above.

Figure 5:
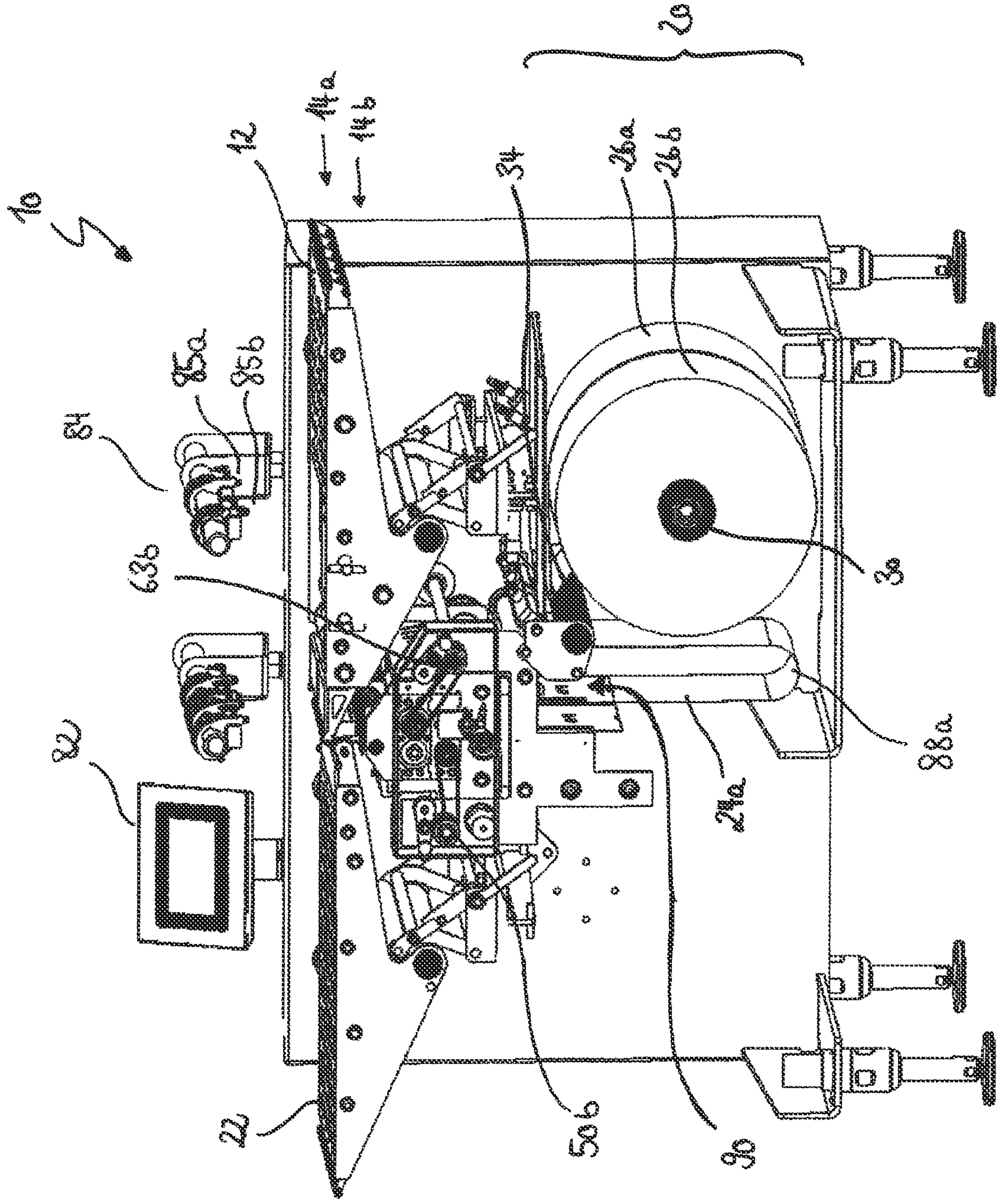
FIG. 5 a perspective side view of an underlay apparatus with an output module and a material provision unit in accordance with a sixth embodiment.

However, the output unit 18 in accordance with FIG. 3 is designed in a modular manner as an output module 18' that has its own frame 86. The output module 18' from FIG. 3 can be moved out of a corresponding holding apparatus of the underlay apparatus 10 in the direction of the viewer, i.e. laterally out of the underlay apparatus 10 with respect to the transport direction of the food products, whereby particularly easy access to the individual functional units of the output module 18' is possible. FIG. 5 also shows an underlay apparatus 10 in accordance with a further embodiment comprising an output module 18'.

A detailed view of an output module 18' is shown in FIG. 4. The functional units of the output module 18', i.e. the draw-in device 46, the separation device 60 and the ejection device 70, are each likewise designed in a modular manner as a draw-in module 46', a separation module 60', and an ejection module 70', i.e. each of the functional units is again arranged in its own frame or housing. The design and operation of the draw-in module 46', the separation module 60', and the ejection module 70' at least substantially agree with the design and operation as described above with reference to FIGS. 2A and 2B.

After the lateral pulling out of the output module 18' from the underlay apparatus 10, the draw-in module 46', the separation module 60', and the ejection module 70' can be removed upwardly from the output module 18' individually after one another, for example, for cleaning or maintenance purposes. In this way, a replacement of individual defective functional units is possible in a very fast and uncomplicated manner and under certain circumstances even without the use of tools. In the event of a malfunction, the operation of the underlay apparatus 10 can thus be resumed as quickly as possible. A lateral removal can also be provided.

In general, the material provision unit 20 can also be configured as a material provision module 20' that can be laterally pulled out and that has its own frame or its own housing to make maintenance, cleaning, and repair, or replacement of the material web rolls 26*a*, 26*b* of the underlay apparatus 10 even easier and more efficient. The removal device 32 can also be configured as a separate removal module 32' having its own frame or as a part module of a material provision module 20'. A material storage module 28' can likewise be configured as an independent module or a part module of a material provision module 20'.

The drive units for the draw-in module 46', the separation module 60', the ejection module 70', or the removal module 32' can generally be integrated into the respective module itself, i.e. fixedly installed in the frame of the respective module.

However, in the shown embodiment examples of FIG. 3 (see also FIG. 5), the drives 50*a*, 50*b* of the first draw-in shaft 48*a* and the second draw-in shaft 48*b* and the drives 63*a*, 63*b* of the first and second blade shafts are attached to a frame of the underlay apparatus 10. A coupling of the drives to the associated functional units takes place after the assembly of the output module 18' by means of drive belts (see FIG. 5).

It also becomes clear from FIG. 3 that it can be advantageous if the total underlay unit 17 is configured as an underlay module 17'. An underlay module 17' can be retrofitted in an uncomplicated manner in an existing line without an underleaver in that it is easily installed between the product feed 12 and the product outfeed 22 beneath the food transport plane. If necessary, already existing conveyor belts or sorting belts can take over the functionality of the product feed belt 12 and the product outfeed belt 22. In a line that already has an underleaver, an underlay module 17' can, for example, be used in a particularly simple manner to extend the functionality to a multi-track underlay function individually per track or to significantly reduce the installation space of an existing multi-track underleaver. In addition, a considerably increased flexibility for the operation of a line for slicing and packaging products results through an underlay module 17'. It is in particular possible to install and remove the underlay module 17' depending on whether an operation of the line is to take place with or without an underleaver.

FIG. 5 shows an underlay apparatus 10 that differs from the underlay apparatus 10 in accordance with FIG. 1 and FIG. 3 in that no dancer rollers 44*a*, 44*b* are provided. Instead, the material webs 24*a*, 24*b* removed individually per track from the material web rolls 26*a*, 26*b* by the removal device 32 are stored in loops 88*a*, 88*b* arranged next to one another. For the sake of clarity, only one material web loop 88*a* is shown in FIG. 5. In order to always have a sufficient amount of sheet material available in the loop store, it is necessary for the control device 82 to control the removal device 32 individually per track such that, after a removal of sheet material by the output unit 18 or the output module 18', the store is again filled individually per track by the removal device 32.

To detect the material web-related unwinding requirement for sheet material, the underlay unit 10 in accordance with FIG. 5 comprises a sheet material detection device 90 that is configured to detect the loop size, and thus the material supply, individually per track. The sheet material detection device 90 comprises one ultrasound sensor 92*a*, 92*b* (not shown) per material web 24*a*, 24*b*, said ultrasound sensor 92*a*, 92*b* being directed into the material loops 88*a*, 88*b* from an upper side and always detecting the size of the material loops 88*a*, 88*b*. The information on the loop size is transmitted to the control device 82 and serves as a basis for the control device 82 for controlling the reception device 32.

Other sheet material detection devices 90 having a suitable sensor system, such as light barriers or the like, can likewise be used to monitor individually per track the storage of a sufficient amount of sheet material in the material loops 88*a*, 88*b*.

REFERENCE NUMERAL LIST

10 underlay apparatus
12 product feed
14*a* first track
14*b* second track
16 sheet feed region
17 underlay unit
17' underlay module
18 output unit
18' output module
19 position correction
20 material provision unit
20' material provision module
22 product outfeed
24*a* first material web
24*b* second material web
26*a* first material web roll
26*b* second material web roll
28 material storage
30 reception shaft
32 removal device
32' removal module
34 removal shaft
36*a* first removal pressure unit
36*b* second removal pressure unit
38*a* first pressure shaft
38*b* second pressure shaft
40*a* first pneumatic apparatus
40*b* second pneumatic apparatus
42*a* first removal gap
42*b* second removal gap
44*a* first dancer roller
44*b* second dancer roller
46 draw-in device
46' draw-in module
48*a* first draw-in shaft
48*b* second draw-in shaft
50*a* drive of the first draw-in shaft 48*a*
50*b* drive of the second draw-in shaft 48*b*
52*a* first draw-in pressure unit
52*b* second draw-in pressure unit
54*a* first draw-in gap
54*b* second draw-in gap
56*a* first pressure roller
56*b* second pressure roller
58*a* first pneumatic system
58*b* second pneumatic system
60 separation device
60' separation module
62*a* first blade shaft
62*b* second blade shaft
63*a* drive of the first blade shaft 62*a*
63*b* drive of the second blade shaft 62*b*
64-1*a* first separation element of the first blade shaft
64-2*a* second separation element of the first blade shaft
64-1*b* first separation element of the second blade shaft
64-2*b* second separation element of the second blade shaft
66*a* first counter-blade
66*b* second counter-blade
68*a* first separation gap
68*b* second separation gap
70 ejection device
70' ejection module
72 drive of the ejection roller 74
74 ejection roller
76 ejection counter-unit
78 pressure roller
79 pneumatic system of the pressure roller
80 ejection gap
82 control device
84 sensor device
85*a* sensor for detecting a food portion of the first track 14*a*
85*b* sensor for detecting a food portion of the second track 14*b*
86 frame of the output module 18'
87 roller or toothed wheel
88*a* material loop of the first material web 24*a*
88*b* material loop of the second material web 24*b*
90 sheet material detection device
92*a* first ultrasound sensor
92*b* second ultrasound sensor

The invention claimed is:

1. An output unit for a provision individually per track of sheet material for placing beneath products fed on two or multiple tracks, said output unit comprising a draw-in device that is configured to draw in individually per track a respective one material web of the sheet material per track;

a separation device that is configured to separate the sheet material from the material webs; and an ejection device that is configured to discharge sheet material on two or multiple tracks and that comprises a driven ejection roller and an ejection counter-unit that forms an ejection gap for the sheet material together with the ejection roller, wherein the ejection roller is jointly associated with at least two tracks.

2. The output unit in accordance with claim 1, wherein the ejection gap and a draw-in gap, which is formed by the at least one draw-in shaft and the at least one draw-in pressure unit, are disposed in a plane that is arranged at least substantially perpendicular in a position of use of the output unit.

3. The output unit in accordance with claim 1, wherein the draw-in device has at least two draw-in shafts, wherein one draw-in shaft is associated with a respective one material web, and/or wherein the draw-in device has at least two draw-in pressure units, wherein one draw-in pressure unit is associated with a respective one material web.

4. The output unit in accordance with claim 1, wherein the separation device comprises at least one blade unit.

5. The output unit in accordance with claim 4, wherein the separation device is configured to separate sheet material individually per track, wherein the separation device has at least two individually driven blade units, wherein one blade unit is associated with a respective one material web.

6. The output unit in accordance with claim 3, wherein the at least two draw-in shafts are coaxially arranged, and/or wherein shafts of pressure rollers of the at least two draw-in pressure units are coaxially arranged, and/or wherein blade shafts of the at least two blade units are coaxially arranged.

7. The output unit in accordance with claim 5, wherein the at least two draw-in shafts are coaxially arranged, and/or wherein shafts of pressure rollers of the at least two draw-in pressure units are coaxially arranged, and/or wherein blade shafts of the at least two blade units are coaxially arranged.

8. The output unit in accordance with claim 1, wherein the output unit is designed in a modular manner as an output module, and/or wherein the draw-in device, the separation device, and/or the ejection device is/are in each case designed in a modular manner as a draw-in module, a separation module, and/or an ejection module.

9. The output unit in accordance with claim 1, wherein the output unit, the draw-in device, the separation device, and/or the ejection device in each case comprises/comprise at least one drive unit that is configured to drive the corresponding unit.

10. The output unit in accordance with claim 1, wherein the ejection device has a mechanical interface by means of which the ejection roller can be drive-effectively coupled to an external drive unit.

* * * * *